J. E. GARRETTE.
PROCESS FOR MAKING BUTTER COMPOUND.
APPLICATION FILED DEC. 2, 1907.

909,781.

Patented Jan. 12, 1909.

2 SHEETS—SHEET 1.

Witnesses:
Clarence Perdew
Stella Rutz

Inventor
John E. Garrette
By James N. Ramsey
Attorney

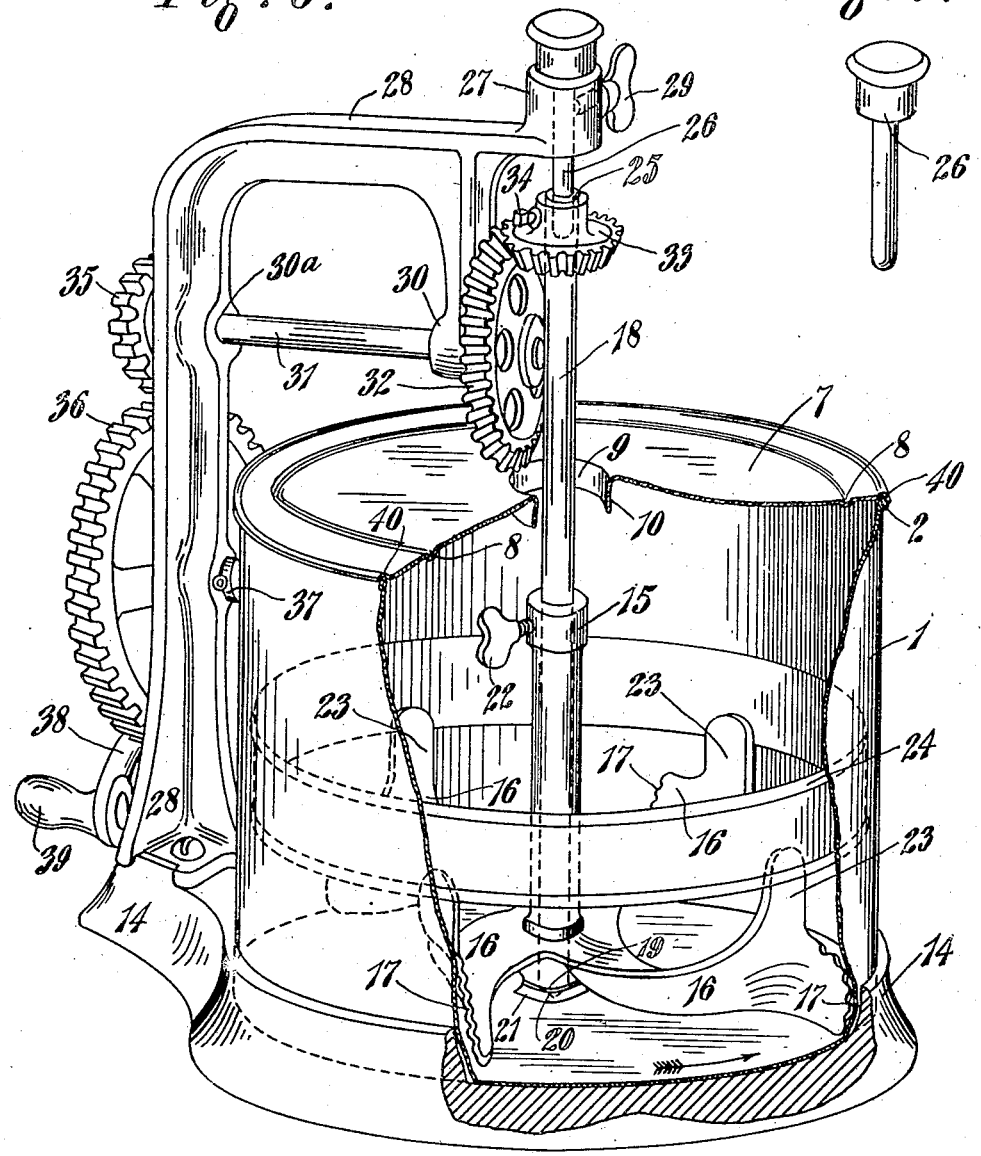

UNITED STATES PATENT OFFICE.

JOHN E. GARRETTE, OF INDIANAPOLIS, INDIANA, ASSIGNOR, BY DIRECT AND MESNE ASSIGNMENTS, OF ONE-FOURTH TO HIMSELF, ONE-HALF TO JAMES N. RAMSEY, AND ONE-FOURTH TO JOSEPH KROMME, BOTH OF CINCINNATI, OHIO.

PROCESS FOR MAKING BUTTER COMPOUND.

No. 909,781.         Specification of Letters Patent.         Patented Jan. 12, 1909.

Application filed December 2, 1907. Serial No. 404,892.

*To all whom it may concern:*

Be it known that I, JOHN E. GARRETTE, a citizen of the United States, residing at Indianapolis, in the county of Marion and State of Indiana, have invented a certain new and useful Process for Making Butter Compound, of which the following is a specification.

My invention relates to process for making butter compound, and the object is to combine milk or cream and salt with butter, as will hereinafter be more fully described.

My invention consists in the process for making butter compound herein set forth and claimed.

Figure 1:
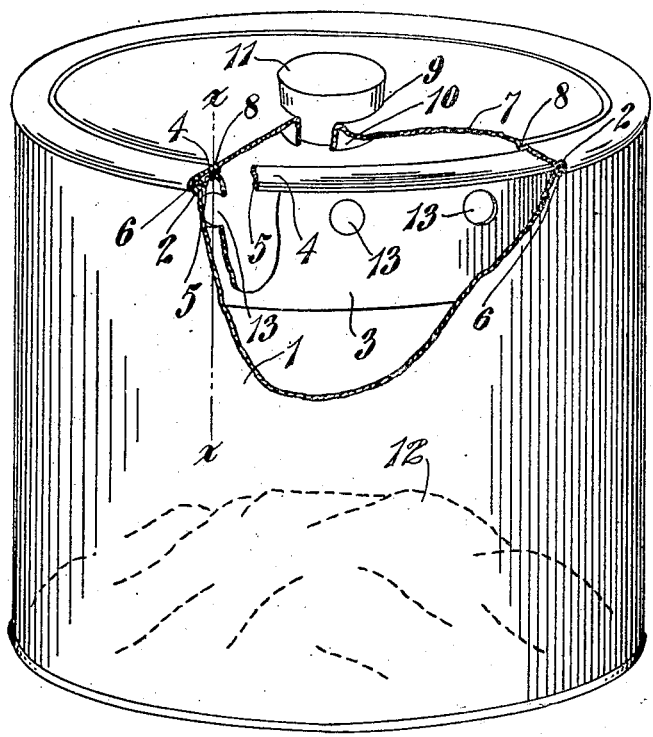
Figure 3:
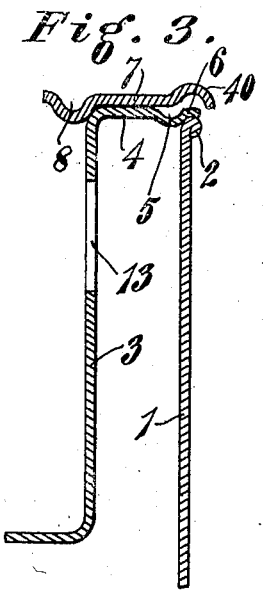
Figure 2:
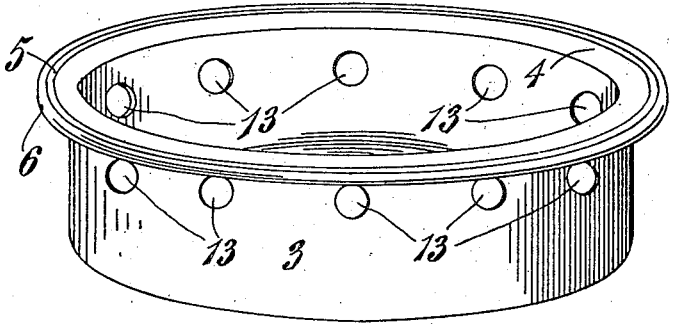
Figure 4:
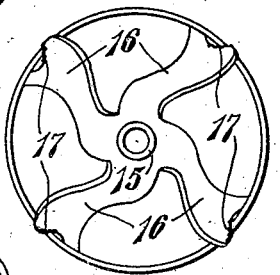
Figure 5:
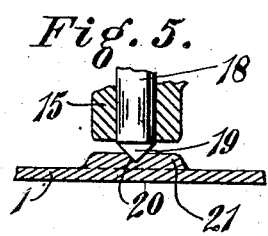

In the drawings: Figure 1 is a perspective view of the vessel with the pan and the lid in place, the parts being broken away to more clearly illustrate how they fit together, and the butter in the vessel being indicated by dotted lines. Fig. 2 is a perspective view of the pan. Fig. 3 is a partial section on a line corresponding to $x$—$x$ of Fig. 1, more clearly illustrating how the vessel, pan and lid are formed to make them interchangeable. Fig. 4 is a bottom plan view of the spinner. Fig. 5 is a partial section through the axial line of the spinner shaft illustrating the lower bearing of the shaft. Fig. 6 is a perspective view of the vessel with the spinner in place and illustrating the operating means for the spinner as I prefer to construct it, parts of the frame and the vessel and its lid being broken away to more clearly illustrate the interior construction. Fig. 7 is a detail perspective view of the removable pin which forms the upper bearing of the spinner shaft.

For the purpose of more clearly illustrating my process, I have shown a preferred construction described as follows:

The vessel 1, of cylindrical shape, is provided with the turned upper edge 2, and the pan 3, of shallow cylindrical formation, is provided with the outwardly extending rim 4 at its top, and this rim 4 is provided with the downwardly extending bead 5 formed at a slight distance inward from the periphery of the rim 4, so as to provide a flange 6 adapted to engage with the turned upper edge 2 of the vessel 1, while the annular bead 5 serves to prevent lateral displacement of the pan. A lid 7 is provided with the annular bead 8 of the proper diameter to fit snugly within the top of the pan 3, thus forming a tight joint therewith and serving to prevent lateral displacement of the lid 7. This lid 7 is provided with the central opening 9, preferably provided with a downwardly extending flange 10, and during the first stage of the process in which my invention is used, this opening 9 is closed by a suitable stopper 11.

A proper quantity of butter 12 is placed in the vessel 1, water heated to the boiling point is placed in the pan 3 and the pan 3 is placed in position with its flange 6 resting upon the beaded upper edge of the vessel 1, and the lid 7, with the stopper in place in the opening 9, is placed upon the pan 3. The pan 3 is provided with a series of perforations 13 near its top, and these perforations 13 allow the escape of the steam from the boiling water so that it passes downward to act on the butter in the bottom of the vessel. After this butter has been acted upon, the next stage of the process is carried out by removing the pan 3 with the water therein, and removing the stopper 11 from the opening 9, after which the vessel 1 with the butter therein is placed on the frame 14, and the spinner placed in position therein. This spinner consists in the hollow shaft 15, on which is mounted a series of radiating blades 16, preferably of the curved formation herein illustrated, and having their outer edges 17 serrated as shown. The spinner shaft 18 extends through the hollow shaft 15, and has the conical bearing 19 adapted to enter a recess 20 in the boss 21, which is provided in the center of the bottom of the vessel 1. A thumb screw 22 is provided for clamping the hollow shaft 15 rigidly to the spinner shaft 18. The blades 16 of the gyrator are preferably provided with the upwardly extending lugs 23 which are rigidly secured to a ring 24, thus giving added strength to the spinner, as well as providing additional contact surface for whirling or spinning the butter during the completion of the process. A recess 25 is provided in the upper end of the spinner shaft 18 to receive the lower end of the pin 26, which is removably secured in the hub 27 of the standard 28 by means of a thumb-screw 29. This standard 28 is rigidly secured to the frame 14 and is provided with bearings 30 and 30ª for the horizontal shaft 31, on one end of which is rigidly mounted the bevel gear 32 in mesh with a pinion 33 which is rigidly secured on the spinner shaft 18 near its upper end by means of a set-screw 34. On the other end of the horizontal shaft 31, a spur pinion 35 is rigidly secured and in mesh with a spur gear 36, which is rotatably mounted on a stud 32 suitably secured in the standard 28. This spur gear 36 is provided with a crank 38 which has a handle 39 for turning.

The lid 7 is adapted to fit on the vessel 1 during the completion of the process with the use of the spinner and its operating mechanism above described, and the spinner shaft 18 is adapted to pass through the central opening 9, in order that the lid 7 may fit snugly on the vessel 1 when the pan 3 has been removed. This lid 7 is provided with an upwardly extending bead 40 directly adjacent to its periphery and adapted to take over the turned upper edge 2 of the vessel 1. The spinner being mounted for operation as above described, milk or cream and salt are put into the vessel along with the butter prepared during the first stage of the process, the lid 7 is placed in position and the spinner operated by turning the crank 38 for a proper length of time, and rotating the spinner shaft 18 in the direction of the arrow, thus spinning the butter and causing the milk or cream and salt to combine therewith, completing the process.

During the first stage of the process, the steam from the pan 3 acts on the butter 12 in the bottom of the vessel 1 with the effect of bringing it into a state whereby it will have an affinity for the milk or cream when it has been introduced in the second stage of the process. The action of the steam on the butter is facilitated, due to the fact that the butter always contains a certain quantity of water, so that the water vapor, or steam, from the pan 3 is attracted to the butter and absorbed with the effect above noted. Then when the butter and milk or cream and salt are placed together and the spinner introduced and operated, the butter particles and milk or cream and salt particles intermingle, this intermingling resulting in the butter and milk or cream and salt particles becoming connatural and producing a semi-solidified body or compound closely resembling butter, and adapted for nearly all the uses for which butter is adapted.

The steaming process, by rendering the butter tenuous, makes it possible for the milk or cream and salt and butter particles to combine when placed together and intermingled, the efficiency of the combination, as well as the amount of milk or cream which can be so combined with a given quantity of butter being determined by the thoroughness of the steaming process as well as by that of the spinning process, experience having shown that the best results are obtained by using a quantity of salt and milk or cream not in excess in weight to that of the butter, and subjecting the butter to the steaming process until it has become sufficiently tenuous and porous to absorb the milk or cream, and after the butter and milk or cream have been placed together, spinning them with the apparatus constructed as herein shown and described until the constituent elements have blended. To obtain the best results, milk or cream should be in a warm state when introduced into the butter.

As substantially all of the milk or cream introduced as above described is permanently combined with the butter, an amount of butter compound, for nearly all purposes equivalent to butter, of substantially twice the weight of the butter used in the process, is obtained by simply introducing comparatively inexpensive milk or cream. At the same time the expense of operation with the machine constructed as herein shown and described, combines with the advantage gained by the use of comparatively inexpensive material to greatly reduce the cost of making the compound, while the simplicity of construction renders the device particularly adaptable for domestic use.

I am aware that it is not new to heat butter and then churn it with milk in the ordinary manner, but

What I claim as new and desire to secure by Letters Patent is the specific method set forth as follows:

1. The process of making butter compound, which consists in first acting upon butter with steam to give it a high temperature and render it tenuous and porous, then introducing milk or cream and salt, then spinning the salt, milk or cream and butter together until the constituent parts are intermingled to render the milk or cream connatural with the butter and combine the ingredients in solidified form, substantially as and for the purposes specified.

2. The process of making butter compound, which consists in first placing butter in a vessel, then introducing boiling water into the vessel out of contact with said butter, whereby steam escaping from the boiling water will act upon the butter to give it a high temperature and to render it tenuous and porous, then placing salt and warm milk or cream with the steamed butter, and then spinning the mixture until all the particles are intermingled and rendered connatural, substantially as and for the purposes specified.

3. The process of making butter compound, which consists in first placing butter in a vessel, next introducing a pan containing boiling water into the vessel above and separate from the butter, next closing the vessel and the pan against the escape of steam therefrom and causing said steam to pass from the pan into the vessel below, whereby it acts upon the butter therein to give it a temperature of 100° Fahrenheit or more and to render it tenuous and porous, next removing the pan and introducing a quantity of salt and milk or cream into the vessel with the tenuous and porous butter, and next rotating it, whereby the milk or cream and butter are spun while the temperature is decreasing until the particles of butter are intermingled with the particles of salt and milk or cream, whereby the salt, milk or cream and butter are rendered connatural, substantially as and for the purposes specified.

JOHN E. GARRETTE.

Witnesses:
 JAMES N. RAMSEY,
 CLARENCE PERDEW.